US012359662B2

(12) United States Patent
Becher et al.

(10) Patent No.: US 12,359,662 B2
(45) Date of Patent: Jul. 15, 2025

(54) METHOD FOR DETERMINING A PRESENT STATE OF WEAR OF A HYDROSTATIC MACHINE

(71) Applicant: Moog GmbH, Böblingen (DE)

(72) Inventors: Dirk Becher, Nufringen (DE); Jacques Philippe Schraft, Stuttgart (DE)

(73) Assignee: Moog GmbH, Böblingen (DE)

( * ) Notice: Subject to any disclaimer, the term of this patent is extended or adjusted under 35 U.S.C. 154(b) by 254 days.

(21) Appl. No.: 17/923,639

(22) PCT Filed: May 6, 2021

(86) PCT No.: PCT/EP2021/061993
§ 371 (c)(1),
(2) Date: Nov. 7, 2022

(87) PCT Pub. No.: WO2021/228677
PCT Pub. Date: Nov. 18, 2021

(65) Prior Publication Data
US 2023/0184240 A1    Jun. 15, 2023

(30) Foreign Application Priority Data
May 11, 2020   (DE) .......................... 102020112660.3

(51) Int. Cl.
*F04B 51/00*     (2006.01)
*F04B 49/06*     (2006.01)
(Continued)

(52) U.S. Cl.
CPC ............ *F04B 51/00* (2013.01); *F04B 49/065* (2013.01); *F04B 49/106* (2013.01); *F16H 57/01* (2013.01);
(Continued)

(58) Field of Classification Search
CPC ...... F04B 51/00; F04B 49/065; F04B 49/106; F04B 2203/0201; F04B 2203/0207;
(Continued)

(56) References Cited

U.S. PATENT DOCUMENTS 6,260,004 B1 * 7/2001 Hays ................... F04D 15/0088
702/183
6,648,606 B2   11/2003 Sabini et al.
2022/0259821 A1 * 8/2022 Takahashi ............. F15B 21/087

FOREIGN PATENT DOCUMENTS

DE          101 57 143 A1     5/2003
DE      10 2011 115650 A1     3/2013
(Continued)

OTHER PUBLICATIONS

European Patent Office (ISA/EP), International Search Report and Written Opinion in PCT/EP2021/061993, dated Jul. 27, 2021, 15 pages.

*Primary Examiner* — Timothy P Graves
(74) *Attorney, Agent, or Firm* — Harter Secrest & Emery LLP

(57) ABSTRACT

The present invention relates to a method for determining a present state of wear of a hydrostatic machine during the operation of the hydrostatic machine. The hydrostatic machine comprises a drive with variable rotational speed and a hydrostatic pump, wherein the drive is designed to drive the hydrostatic pump for generating a volume flow of a fluid, and wherein the hydrostatic machine is connected to a fluid transport channel in which the fluid is transported in a manner driven by the hydrostatic machine. The method has a step for determining a first torque of the drive at a specified drive vector. Furthermore, the method has a step for ascertaining a second torque of the drive at the specified drive vector using a first calculation method, and in addition, the method has a step for determining the present state of wear
(Continued)

of the hydrostatic machine using a second calculation method, in order to compare the first determined torque and the second ascertained torque to one another.

14 Claims, 3 Drawing Sheets

(51) Int. Cl.
*F04B 49/10* (2006.01)
*F16H 57/01* (2012.01)

(52) U.S. Cl.
CPC ............... *F04B 2203/0201* (2013.01); *F04B 2203/0207* (2013.01); *F04B 2205/01* (2013.01); *F04B 2205/05* (2013.01); *F04B 2205/09* (2013.01); *F04B 2205/14* (2013.01)

(58) Field of Classification Search
CPC .............. F04B 2205/01; F04B 2205/05; F04B 2205/09; F04B 2205/14; F16H 57/01
See application file for complete search history.

(56) References Cited

FOREIGN PATENT DOCUMENTS

| | | | |
|---|---|---|---|
| EP | 2655895 | A1 | 10/2013 |
| WO | 2019092122 | A1 | 5/2019 |
| WO | 2019233859 | A1 | 12/2019 |

* cited by examiner

METHOD FOR DETERMINING A PRESENT STATE OF WEAR OF A HYDROSTATIC MACHINE

The present invention relates to a method for determining a present state of wear of a hydrostatic machine. In addition, the present invention comprises an electrohydrostatic pump device. Hydrostatic machines are used to generate a volume flow of a fluid. In known applications, the fluid is a hydraulic liquid.

Hydrostatic machines are mechatronic systems and are known in the prior art. Hydrostatic machines have at least one hydrostatic pump and one drive. In the interior, the hydrostatic pumps mentioned have movable parts which move or are moved relative to one another along the surfaces of other parts of the hydrostatic pump during operation. The resulting friction between the surfaces can lead in the medium or long-term to wear or abrasion of the hydrostatic pump over the service life of the hydrostatic pump. The wear on the hydrostatic pump can cause the leakage of the hydrostatic pump to increase. This can lead to a reduction or decrease in the volume flow on the high-pressure side of the hydrostatic pump due to the reduced pumping power resulting from the leakage. A decrease in the volume flow on the high-pressure side of the hydrostatic pump can lead to a reduction of the speed of movement of the hydraulic components driven by the hydraulic liquid, for example, a reduced speed of movement of a hydraulic cylinder. In addition, the wear in the hydrostatic pump can cause the friction between the movable surfaces in the interior of the hydrostatic pump to increase. An increase in the friction can cause the drive torque for operating a hydrostatic pump to likewise increase.

Hydrostatic pumps known in the prior art have the disadvantage that their respective state, in particular their state of wear, is not known in every phase of the application. The present, actual power of the hydrostatic pump is therefore also not known, or it is not possible to make a statement about it with 100% accuracy. For an operator of the hydrostatic pump or the machine, it would be advantageous to obtain knowledge about the current state of wear of the hydrostatic machine. With this corresponding knowledge, wear-optimized maintenance of the hydrostatic machine can be carried out. In the prior art, no system is known which, during the operation of the hydrostatic pump, that is to say without the need to operate the hydrostatic machine at a defined operating point, that is to say at a defined speed of the hydrostatic pump, defined pressure and defined fluid viscosity, enables carrying out a corresponding wear measurement of the hydrostatic machine.

WO 2019/092122 A1 discloses a method with which the state of wear of a hydrostatic pump can be determined. The method is based on the idea of parameterizing a model of a hydrostatic pump on the basis of measured system parameters, which model calculates the theoretical volume flow of a brand-new hydrostatic pump for corresponding operating parameters. The ascertained volume flow is compared to an actual volume flow ascertained by measurement, and results in a value which corresponds to the health index of the hydrostatic pump.

The method known from WO 2019/092122 A1 has the disadvantage that, when an additional leakage in the hydraulic drive system occurs, a decrease in the volume flow can be detected, but this detected decrease in the volume flow cannot be unambiguously attributed to the hydrostatic machine. For example, a leakage at one of the valves or in the hydraulic cylinder can likewise lead to a decrease in the health index of the hydrostatic machine.

Proceeding from this point, the present invention is based on the technical object of at least partially overcoming the disadvantages known in the prior art in order to improve a localization of the cause of the wear or abrasion.

This object is achieved by the subject matters of the independent claims, in particular by a method and by an electrohydrostatic pump device. Advantageous embodiments of the invention are described in the dependent claims and in the following description.

According to a first aspect, the invention relates to a method for determining a present state of wear of a hydrostatic machine during the operation of the hydrostatic machine. The hydrostatic machine has a drive with variable rotational speed. In addition, the hydrostatic machine has a hydrostatic pump. The drive is designed to drive the hydrostatic pump in order to generate a volume flow of a fluid. The drive can be designed as an electric drive, for example as a three-phase motor, etc. The drive provides a required actual torque to the hydrostatic pump. By means of the applied torque, a defined hydraulic pressure is generated by the hydrostatic pump. In addition, the hydrostatic machine is connected to a fluid transport channel in which a fluid is transported in a manner driven by the hydrostatic machine. The hydrostatic machine has a connection, in particular a fluid-transporting connection, to a hydraulic drive system. The hydraulic drive system comprises the fluid transport channel. The fluid, in particular hydraulic liquid, is transported via the fluid transport channel to the corresponding hydraulic components of the hydraulic drive system in order to drive them. The method preferably comprises the following method steps:

In a first method step, a first torque of the drive, in particular a value for a first torque of the drive, is determined at a specified drive vector. In a further step, a second torque of the drive, in particular a value for a second torque of the drive, is ascertained at the specified drive vector using a first calculation method. In a further step, the present state of wear of the hydrostatic machine is determined using a second calculation method. In the second calculation method, the first determined torque and the second ascertained torque are compared to one another. Within the meaning of the present invention, "to compare to one another" means to ascertain the ratio between an actual torque of the drive and a calculated torque, in particular the torque of the drive ascertained by the first calculation method. The wear or abrasion of the hydrostatic machine can be assessed via the ratio. According to the invention, a health index is ascertained.

The present invention is based on the knowledge that there is a need for ascertaining the actual health index of a hydrostatic machine, taking into account that further leakages in the hydraulic system can falsify correspondingly ascertained values for wear or abrasion. Currently known methods for determining a present state of wear of a hydrostatic machine do not provide any way to take into account these leakages which cause calculation errors.

The present invention makes it possible to advantageously estimate, using the torque and the volume flow, and their mutual relative development, where wear has occurred and/or is taking place in the hydraulic system. It is possible to conclude that wear is present in the hydrostatic machine if, for example, both of the wear variables (torque, volume flow) worsen. If, on the other hand, only one of these two wear variables worsens, the cause of wear must be detected in the particular system area.

Advantageous embodiments and developments emerge from the dependent claims and from the description with reference to the figures.

In a preferred embodiment of the invention, the step of determining a first torque of the drive comprises ascertaining a product of a present consumption of current of the drive and a proportional factor. The proportional factor represents a characteristic variable of the drive. For example, in the case of an embodiment of the drive as a servomotor, the torque can be determined via the current applied to the servo-drive. The servo-drive constitutes a specific electronic amplifier which is used to drive servomechanisms. The current applied to the three phases can be ascertained via the servo-drive. In this embodiment, the drive constitutes a sensor for determining the applied current. The actual torque Mact results from the measured current I (applied current) and the proportional factor Kt. The invention is not limited to the aforementioned use of a servo-drive. Rather, the person skilled in the art is aware that further control units can be designed to detect or measure the current of the drive.

In an alternative embodiment of the invention, the step of determining a first torque of the drive comprises measuring the first torque with a torque sensor. The hydrostatic pump of the hydrostatic machine generates an actual volume flow in the fluid channel of the hydraulic system. As a result, a present actual torque is required at the hydrostatic drive of the hydrostatic pump. The actual torque for calculating the ratio can be ascertained via the measurement using a torque sensor. The torque at the drive can be ascertained via a torque sensor. The torque sensor can be placed between the drive and the pump of the hydrostatic machine, for example on the shaft.

In a further embodiment, both the torque sensor and the determination of the actual torque by measuring the current in the phases by the drive can be used simultaneously in a redundant design. This reduces a failure risk.

In one embodiment, the first calculation method comprises multivariate regression. In particular, the first calculation method consists of a multivariate regression of the entire drive vector. For this purpose, pairs of drive vector and torque are used as measurement data. For this purpose, various measurement instructions can be applied in order to obtain the corresponding pairs. For example, a D-dimensional grid can be created for the drive vector. This grid can comprise n equidistant grid points in each dimension. The individual grid points can be measured. Alternatively, the drive vector can be changed over time and the torque can be measured continuously. In order to capture all dimensions of the entire drive vector, all values or a specified selection of sampling values of the complete drive vector of dimension D can be measured. In particular hydrostatic pumps, it may be sufficient to take into account only a subset of the dimensions and/or of the values of the drive vector.

In one embodiment, the first calculation method comprises the use of at least one lookup table. A value for the second torque of the drive can be calculated from the at least one lookup table. A grid of points, in particular data points, can be stored by the lookup table. Via the lookup table, the data points can be statically defined and used to avoid complicated calculations during the runtime of the program. In the lookup table, precalculated results are defined for particular constellations of input parameters (e.g., drive vectors) and stored with the association. The individual entries of a lookup table can be identified and addressed via a search term of a column or via a position. Interpolations are made between adjacent entries during the evaluation of the lookup table. Each entry contains correspondingly predefined information. By means of the lookup table, complex calculations during the program runtime can be replaced by a generally fast value search. In addition, no prior knowledge is necessary when lookup tables are used. These tables are instantly ready for use as soon as entries are present.

In a further embodiment, the first calculation method comprises a physical model of a hydrostatic machine. A value for the second torque of the drive is derived from the physical model. Within the meaning of the present invention, a physical model constitutes a continuous simulation of the underlying physics. In particular, a physical model is derived from a healthy hydrostatic machine. A healthy hydrostatic machine within the meaning of the present invention is understood to mean a hydrostatic machine which has not yet been used to generate a hydraulic pressure and thus has not been subjected to wear. The physics of the physical model is in this case represented by equations, in particular by differential equations. The corresponding equations must be calculated for each time interval. For creating the physical model, the actual torque is recorded and particular parameters are measured on a healthy hydrostatic machine using further sensors.

In a further embodiment, the first calculation method is designed as a machine learning module. For example, the module may comprise a trained artificial neural network (ANN). Neural networks can be used for classification, cluster recognition, or regression. In general, neural networks consist of a plurality of parameters that interfere with one another in a previously defined manner in order to achieve a desired result. The optimal set of parameters is ascertained in a teaching phase for the neural network. In this case, the individual parameters are varied, for example by means of a gradient descent method, until the neural network achieves the desired result(s). The use of a neural network has the advantage that the structure of the individual measurement data, and thus a mapping of reality, can be taught. In addition, the measurement data do not require any order and/or structure. The neural network does not restrict dimensionality. The required computing power and the memory requirements for the calculation of the neural network can be controlled via the number of parameters used. In addition, during use, the neural network can be re-trained and/or further trained by means of the evaluated data such that the value for the second torque of the drive is ascertained more precisely and accurately.

In a preferred embodiment, the neural network comprises a feed forward architecture. This architecture offers simplified handling and low computing use for the evaluation. Thus, the neural network can be implemented in the microcontrollers, for example the fixedly integrated computing units of the machines.

In one embodiment, the first and/or the second calculation method is stored and executed, in particular locally, in a control unit of the hydrostatic machine. The control unit can comprise a memory unit designed as a non-volatile memory, for example a flash drive or a magnetic plate, and a processor unit for executing the model or the trained artificial network. This is particularly advantageous in the case of independent hydrostatic machines, with or without limited communication connections to other and/or central control units.

In an alternative or supplementary embodiment, the model or the trained artificial network is stored and executed in a spatially separated control unit in a global environment. Thus, the model or the trained artificial network can, solely or additionally, be stored centrally, for example in a central server or in a computer cloud system. This is advantageous if the control unit of the hydrostatic machine does not have the computing power and/or the memory area to carry out corresponding calculations. In this regard, the calculations can be outsourced to the central server or into the cloud via corresponding communication connections, and only the result is received and evaluated and/or applied.

In addition, it is possible to, solely or additionally, store the sampling points of the measurements centrally. This can be done on a central server on-site, or in the server cluster in the cloud. This is advantageous if warnings, evaluations of any type and/or maintenance strategies are to be derived from the current state of wear of the hydrostatic machine. Furthermore, this could be the basis for capturing the entire service life of the hydrostatic pump.

In a further embodiment according to the invention, the first calculation method comprises a polynomial function, for example a linear function, of the values of the drive vector. Using the polynomial function, approximators for the torque can be obtained.

Using this method, it is necessary to determine an actual torque of the drive of the hydrostatic machine. It is known in this respect that, in the case of wear of the hydrostatic pump, a greater torque must be provided than is needed when a new hydrostatic pump is used. In this case, it is not possible with methods according to the prior art to infer the current state of wear of the hydrostatic pump from the actual torque. The reason is that the actual torque, which can be ascertained, depends on many system variables, e.g., on the viscosity and/or the temperature and/or the pressure of the hydraulic liquid. Moreover, at least some of these system variables depend on other system variables, sometimes in a complex manner. One example could be the dependence of the viscosity of the hydraulic liquid on its temperature, wherein this dependence is in turn dependent on the type of liquid used and can be different for any type of hydrostatic pump, for example according to the maximum power of a hydrostatic pump. As a further example, there could also be a dynamic dependence between system variables; for example, the dependence between the rotational speed of the hydrostatic pump and the pressure of the liquid in a transition situation can be best described by a differential equation.

The corresponding system variables which influence the torque of a hydrostatic pump can be represented by a drive vector of the dimension D. Each dimension of the drive vector has a relevant range, i.e., a minimum and a maximum value, which are either the ranges of physically permissible values, possibly limited by technical limitations, or are otherwise limited. For example, the range of the pressure p of a fluid in a particular pump type could be as follows: Range $(p)=(p_{min}, p_{max})=(1$ mPa, 30 mPa (10 bar, 300 bar)).

Based on the knowledge of the behavior of a particular hydrostatic pump or a class of pumps, a model of the hydrostatic pump used can be created depending on the values of the drive vector. The created model thus constitutes the basis for the first calculation method. In principle, the torque of the pump can be calculated by a function that takes into account all relevant values of each dimension of the drive vector.

In a simple exemplary implementation of the first calculation method, it is possible to consider, for the purpose of a simplified example, only a single drive vector, which consists of a delivery volume V [ccm] and a pressure p. Such a first calculation method could, for example, calculate the following torque $M_{comp}$ (calculated torque):

$$Mcomp(V,p)=Mcomp(19,20)=10.75 \text{ Nm}$$

for a predetermined drive vector, which has a delivery volume of V=19 ccm and a pressure of p=2 mPa (20 bar). Another exemplary predetermined drive vector may have a delivery volume of V=19 ccm and a pressure of p=28 mPa (280 bar), which results in a calculated value for the torque of $M_{comp}$ (19, 280)=96.75 Nm.

According to the invention, the state of wear of the hydrostatic machine is determined by means of a second calculation method, which basically compares the determined first torque (actual torque) of the drive of the hydrostatic machine to the second torque of the drive ascertained using the first calculation method. This ratio or the quotient of the ascertained torque (calculated torque) to the determined actual torque represents a quantitative variable of the state of wear (value for the wear) of the hydrostatic machine at the time of the measurement.

In one embodiment according to the invention, the second calculation method ascertains a ratio, namely a quotient, of the first determined torque at a specified drive vector to a second ascertained torque at the specified drive vector.

Using the above values of the drive vector as an example, the actually measured torque $M_{act}$ (measured torque) for a predetermined drive vector, which has a delivery volume of V=19 ccm and a pressure of p=28 mPa (280 bar), may be $M_{act}$ (19, 280)=101.31 Nm. This would lead to the following quantitative value for the present state of wear:

$$w=M_{comp}(19, 280)/M_{act}(19, 280)=96.75 \text{ Nm}/101.31 \text{ NM}=95.50\%.$$

In one embodiment according to the invention, the second calculation method ascertains a ratio, namely a mean value, from a set of quotients, wherein each of the quotients is the quotient of the first determined torque at a specified drive vector to a second ascertained torque at the specified drive vector.

For various operating points, i.e., for various drive vectors, the present wear values can then be recorded in a history. An average value for the state of wear in a specified time window can be determined therefrom. A second exemplary measured value for the torque is Mact (19, 20)=11.59 Nm, from which a second present state of wear w can be calculated:

$$w=M_{comp}(19, 20)/M_{act}(19, 20)=10.75 \text{ Nm}/11.59 \text{ Nm}=92.75\%.$$

Accordingly, the present average wear would be w=94.13%.

As an alternative, it can be provided that the values for the state of wear w are weighted. For example, the values of w at lower pressure values could be weighted less and the values at higher pressure values could be weighted more. One reason for this stronger emphasis of wear at higher pressure values can be that the hydraulic system is operated more frequently with higher pressure values. As a quantitative example, a weight of 20% for wear at 2 mPa (20 bar) and 80% for the wear at 28 mPa (280 bar) can be used. Then, using the same values as stated above, the weighted present average wear would be w=94.95%.

In one embodiment of the invention, the drive vector comprises a rotational speed of the drive of the hydrostatic machine. An advantage of taking into account the rotational speed is that it is immediately clear to an operator that, in the case of pumps which are driven at variable rotational speed, the power of the hydraulic system correlates strongly with the present rotational speed of the drive. Users of hydraulic systems are used to working with tables based on the rotational speed of the drive in order to assess the power of the drive. Moreover, the corresponding rotational speeds can be measured in a simple manner. In addition, the rotational speed has an effect on the torque due to the speed-dependent friction, so the rotational speed is a good indicator of a change in the state of wear.

In other embodiments of the method according to the present invention, the drive factor may comprise further values. Examples may be the hydraulic liquid variety (type of fluid), or the present delivery volume of the fluid used in the hydrostatic pump. Knowledge of the present delivery volume and its use can be advantageous in that the torque to be determined depends greatly on the amount of fluid delivered per revolution of the hydrostatic machine.

In a further embodiment according to the invention, the drive vector comprises a first pressure of the fluid. The first pressure of the fluid describes the pressure at the working output. In addition, the leakage flow of a pump is generally higher at higher pressure values. It is therefore advantageous to incorporate a first pressure of the fluid into the determination of the torque.

In an embodiment according to the invention, the drive vector comprises a second pressure of the fluid, which describes the pressure of the fluid fed into the pump. Thus, the second pressure can relate to the pressure at the second pressure opening of the pump. For example, the first pressure can relate to a first pressure connection of the pump and can achieve a high working pressure for the movement of the pump cylinder. In this respect, the second pressure has an effect on the second connection of the pump and generates a low bias pressure. The resulting difference between the first pressure and the second pressure influences the leakage flow of the pump. The torque depends greatly on this difference, which corresponds to what is referred to as load pressure. In some circumstances, a pressure-dependent deformation of the pump may occur, which influences the friction and thus affects the torque.

In an embodiment according to the invention, the drive vector comprises a viscosity of the fluid. This has an effect on the lubrication of the components moving relative to one another and on the fluid moving in the pump housing, which causes an additional torque. Often, the viscosity has a typical value for a type of hydraulic liquid. This value must be taken into account in cases in which the fluid is exchanged for another type of hydraulic liquid. Furthermore, the viscosity of the fluid can depend on its temperature. Various types of fluids are generally dependent on their temperatures in different forms.

In an embodiment of the invention, the drive vector contains a temperature of the fluid. The temperature of the fluid in particular influences the viscosity of the fluid, according to its type and/or class.

The drive vector may both comprise a previously mentioned parameter and, in various embodiments, take into account a plurality of the previously mentioned parameters. The calculation of the state of wear is thus more accurate since the actual conditions under which the hydrostatic machine is used are taken into account.

In one embodiment, the hydrostatic machine is designed as a hydrostatic pump or as a hydrostatic motor or as a hydrostatic 4-quadrant machine.

In one embodiment, the hydrostatic pump comprises a radial piston pump or a radial piston pump with variable adjustment.

In one embodiment, the determined present state of wear is used for a wear prognosis of the hydrostatic machine. Advantageously, a prediction for future values of the state of wear can be determined after the generation of a wear history. This is useful in particular when both the entire service life of the hydrostatic machine and data of the states of wear of a class of hydrostatic machines and of their hydrostatic pumps are available. Typically, this comprises not only values of recorded torques but also a wear history of one or more hydrostatic machines. Based on these data, the state of wear and/or the wear of the hydrostatic machine can be predicted. Various methods can be used for this purpose, such as Markov chains, Kalman filters, and/or machine learning approaches.

In one embodiment, the present state of wear can be used as an input parameter for a simulation of a state of the hydrostatic machine. Via the simulation, the wear can advantageously be calculated and/or illustrated in order to plan and/or carry out corresponding maintenance and servicing measures. In particular, the simulation can be used for predictive maintenance approaches.

A further aspect of the present invention comprises an electrohydrostatic pump device. The electrohydrostatic pump device comprises a hydrostatic pump, a drive with variable rotational speed, and an electronic control unit. The electronic controller is capable of performing a method according to any of the method claims of the present invention. The control unit can have one or more processors which are designed to perform the method. Furthermore, the control unit can comprise memories, in particular volatile and/or non-volatile memories, in order to store the method and/or sampling values for the drive vectors. In a further embodiment, the control unit can have means for communication, in particular for data communication. The means comprise wired, e.g., LAN, serial/parallel interfaces etc. and/or wireless, e.g., WLAN, Bluetooth interfaces, etc.

In one embodiment, the method according to the invention can be stored and executed a decentralized target platform with an external electronics/controller. The external electronics/controller can be installed locally next to the machine to be driven accordingly or can be installed centrally at an intended position in the manufacturing facility. In a further embodiment, the method can be stored and executed in a server cluster, for example in a cloud.

The embodiments of the method according to the invention described above can also be designed as a computer program, wherein a computer is made to carry out the method according to the invention described above when the computer program is executed on a computer or on a processor of the computer, preferably the control unit. The computer program may be provided as a signal by download or stored in a memory unit of the computer with computer-readable program code contained therein, in order to make the computer execute instructions according to the aforementioned method. The computer program may also be stored on a machine-readable storage medium. An alternative solution to the object of the invention provides a storage medium which is intended for storing the method described above and is readable by a computer or processor.

The above embodiments and developments can be arbitrarily combined with one another insofar as is reasonable. Further possible embodiments, developments, and implementations of the invention also include combinations, not explicitly mentioned, of features of the invention described above or below with respect to the exemplary embodiments. In particular, the person skilled in the art will also add individual aspects as an improvement or additions to the respective basic form of the present invention.

The present invention is explained in more detail below using the exemplary embodiments specified in schematic figures of the drawings. In the figures.

Figure 1:
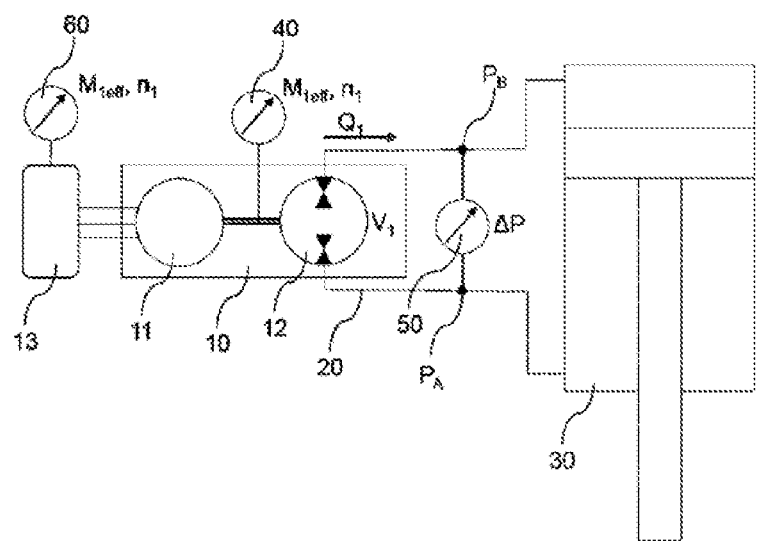
FIG. 1 is a schematic illustration of a simplified hydraulic system.

The accompanying drawings are intended to impart a further understanding of embodiments of the invention. They illustrate embodiments and, in conjunction with the description, serve to explain principles and concepts of the invention. Other embodiments and many of the mentioned advantages result with regard to the drawings. The elements of the drawings are not necessarily shown to scale relative to one another.

In the figures of the drawing, identical, functionally identical, and identically acting elements, features, and components are respectively provided with the same reference signs unless stated otherwise.

FIG. 1 shows a schematic illustration of a simplified hydraulic system. The hydraulic system in the illustrated form comprises a hydrostatic machine 10, a cylinder 30, preferably a hydraulic cylinder. The hydraulic cylinder 30 is connected to the hydrostatic machine 10 via fluid channels 20 (further necessary components of the hydraulic system, which are of little relevance to the present invention, are not shown). In the simplified form, the hydrostatic machine 10 comprises a hydrostatic pump 12 which is driven by a drive 11, preferably an electric motor with variable rotational speed n. The connection between the drive 11 and the hydrostatic pump 12 can be implemented, for example, via a shaft, transmission, etc. During operation of the hydrostatic machine 10, the shaft has a specific rotational speed n. The hydrostatic pump 12 is connected via the fluid channels 20 (supply and return flow) to a hydraulic cylinder 30, for example a differential cylinder. Differential cylinders are known in the prior art and have a piston, a piston rod, and two cylinder chambers. The hydrostatic pump 12 pumps the hydraulic liquid via the fluid channels 20 to the cylinder 30. By pumping the hydraulic liquid into the respective pressure chamber of the hydraulic cylinder 30, the piston and the piston rod are moved in the respective direction (retraction/extension of the cylinder). In addition, FIG. 1 shows the drive 13 as a control unit for the drive 11 of the hydrostatic machine 10. The currents for driving the drive 11 are provided and controlled via the drive 13. Furthermore, the consumption of current, for example the nominal consumption of current of the drive 11, can be measured via the drive 13. Internal measuring instruments or methods can be used for this purpose. From the measured present consumption of current and a proportional factor, a first torque $M_{1,eff}$ of the drive 11 can be ascertained. Furthermore, the rotational speed $n_1$ of the drive 11 can be determined via the drive 13. The rotational speed $n_1$ may be contained in the drive vector. In an alternative or combined embodiment, the hydrostatic machine 10 can have a torque sensor 40 and a sensor 40 for detecting the rotational speed $n_1$. The torque sensor 40 and the rotational speed sensor 40 for detecting the rotational speed $n_1$ can be introduced into the hydrostatic machine 10 in such a way that they determine the first torque $M_{1,eff}$ of the drive 11 and the rotational speed $n_1$. Using a first calculation method, a second torque of the drive 11 can be ascertained at a specified drive vector. The first calculation method may comprise the use of a lookup table and/or of a physical model of a hydrostatic machine 10 and/or a machine learning module. A present state of wear w of the hydrostatic machine 10 can be determined using a second calculation method. For this purpose, in the second calculation method, the first determined torque $M_{1,eff}$ and the second ascertained torque are compared to one another as follows: $M_{1,eff}=f(V_1, n_1, \Delta P, v)$ wherein $M_{1,eff}$ corresponds to the determined first torque of the drive 11 at a corresponding drive vector, and the drive vector comprises a delivery volume $v_1$, a rotational speed $n_1$, a differential pressure $\Delta P$, and/or a value for the viscosity v of the fluid. Embodiments according to the invention may take into account one or a plurality of parameters for a drive vector. The differential pressure $\Delta P$ can be detected by means of a pressure sensor 50 which ascertains the pressure difference from the pressures $P_A$, $P_B$. The state of wear w or the health index HI of the hydrostatic machine 10 results from $w=M_{1,100\%}/M_{1,eff}$, where $M_{1,100\%}$ corresponds to the second torque ascertained by the first calculation method.

Figure 2:
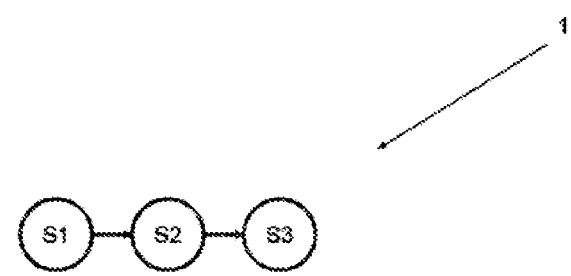
FIG. 2 is a flowchart of an embodiment of the method according to the invention.

FIG. 2 shows a flow chart according to a preferred embodiment of the method according to the invention. In the shown embodiment, the method 1 comprises a plurality of steps. In a first step S1, a first torque of the drive 11 is determined at a specified drive vector. In a second step S2, a second torque of the drive 11 is ascertained at the specified drive vector, using a first calculation method. In a third step S3, the present state of wear of the hydrostatic machine 10 is determined using a second calculation method. The first determined torque and the second ascertained torque are compared to one another.

Figure 3:
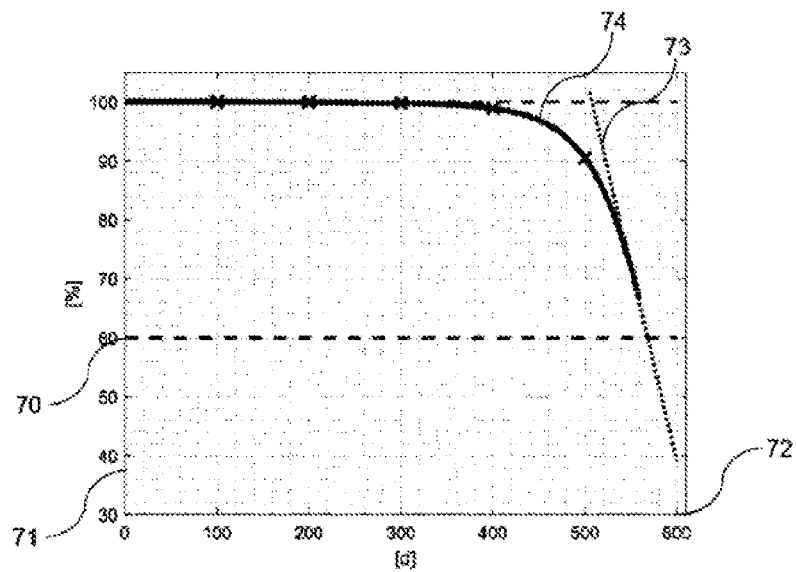
FIG. 3 is an example of a variation of the power state.

FIG. 3 shows an example of the curve of the state of wear w in % and/or the health index HI in % of a hydrostatic machine 10, as could occur over a particular useful life d. The curve 74 constitutes the variation of the state of wear w in % (y-axis 71) and/or of the health index HI in % over a useful life d (x-axis 72). Over the useful life d, values for the differential pressure $\Delta P$, the delivery volume $V_1$, the rotational speed $n_1$, and the value for the viscosity v of the fluid are detected for a drive vector at particular intervals (100, 200, etc.). Table 1 lists exemplary values for the differential pressure, the delivery volume, the rotational speed, and the viscosity. For this drive vector, a first torque $M_{1,eff}$ is determined by measuring the current of the drive 11 and using a proportional factor, and/or by measuring by means of a torque sensor. By means of a first calculation method, a second torque $M_{1,100\%}$ is ascertained for the corresponding drive vector. The first torque and the second torque are compared to one another using a second calculation method, and result in the state of wear w or the health index HI. It can be seen in FIG. 3 that the health index HI in % worsens over the useful life, which is represented by the falling curve 74. Furthermore, FIG. 3 shows a boundary line 70. This boundary line 70 represents a region in which the state of wear w, represented by the curve 74, reaches a value at which maintenance or servicing measures should be taken in order to remedy the wear in the hydrostatic machine 10 or to limit negative consequences for a hydraulic system to a minimum. In addition, the curve 73 shows how the curve 74 can be extrapolated for the application of predictive maintenance. A prediction can thus be made about the time profile of the state of wear. This extrapolation can be achieved by linear regression, as shown in FIG. 3, or alternatively with the aid of Markov chains, Kalman filters, and/or machine learning algorithms. A history of the state of wear is required for this purpose. In an advantageous manner, an operator of the system can plan, prepare, or perform necessary maintenance procedures of the machine using the information about the state of wear. In FIG. 3, the points marked with "X" represent the corresponding measurement points of the state of wear, and the curve 74 is ascertained via the simulation/extrapolation with the aid of the aforementioned methods (Markov chains, etc.).

It can be seen from Table 1 that the determined first torque $M_{1,eff}$ has a higher value than the second ascertained torque $M_{1,\ 100\%}$. This can be attributed to friction within the hydrostatic machine 10 or the hydrostatic pump 12. The result is a worsened health index HI. The health index HI steadily decreases over the useful life d. This index can be used for a wear prognosis and/or a simulation of the state of wear and can result in predictive maintenance.

TABLE 1

| Time [d] | Δp [bar] | $V_1$ [cmm] | $n_1$ [rpm] | v [cSt] | $M_{1,100\%}$ [Nm] | $M_{1,eff}$ [Nm] | HI [%] |
|---|---|---|---|---|---|---|---|
| 100 | 100 | 19 | 1250 | 98 | 35.72 | 35.73 | 99.97 |
| 200 | 150 | 14.25 | 500 | 83 | 39.98 | 40.00 | 99.94 |
| 300 | 10 | 19 | 2500 | 95 | 3.94 | 3.95 | 99.81 |
| 400 | 100 | 19 | 1300 | 72 | 35.62 | 36.02 | 98.90 |
| 500 | 150 | 14.25 | 575 | 82 | 40.02 | 42.26 | 90.47 |

Finally, it should be pointed out that the description of the invention and the exemplary embodiments are basically not to be understood as limiting with regard to a particular physical realization of the invention. All features explained and shown in conjunction with individual embodiments of the invention can be provided in different combinations in the subject matter according to the invention in order to simultaneously realize their advantageous effects.

The scope of protection of the present invention is defined by the claims and is not limited by the features explained in the description or shown in the figures.

LIST OF REFERENCE SIGNS

1 Method
10 Hydrostatic machine
11 Drive
12 Hydrostatic pump
13 Drive
20 Fluid transport channel
30 Hydraulic cylinder
40 Torque sensor
50 Pressure sensor
60 Current detector
70 Wear limit
71 y-axis (health index)
72 x-axis (running time)
73 PM
74 State of wear (health index)
S1-S3 Method steps
$P_A$, $P_B$ Pressure
$Q_1$ Volume flow
$V_1$ Delivery volume
$M_{1,eff}$ Actual torque
n Rotational speed

The invention claimed is:

1. A method for determining a present state of wear of a hydrostatic machine during the operation of the hydrostatic machine comprising a drive with variable rotational speed and a hydrostatic pump, wherein the drive is designed to drive the hydrostatic pump in order to generate a volume flow of a fluid, and wherein the hydrostatic machine is connected to a fluid transport channel of a hydraulic drive system in which the fluid is transported from the hydrostatic machine to the hydraulic drive system in a driven manner, comprising the following steps:
determining a first torque of the drive at a specified drive vector by (i) ascertaining a product of a consumption of current of the drive and a proportional factor and/or (ii) measuring the first torque with a torque sensor,
ascertaining a second torque of the drive at the specified drive vector using a first calculation method; and
determining the present state of wear of the hydrostatic machine using a second calculation method, in order to compare the first determined torque and the second ascertained torque to one another.

2. The method according to claim 1, wherein the first calculation method comprises the use of at least one lookup table, and a value for the second torque of the drive is calculated from the lookup table.

3. The method according to claim 2, wherein the first calculation method comprises a physical model of the hydrostatic machine, and a value for the second torque of the drive is derived from the physical model.

4. The method according to claim 3, wherein the first and/or the second calculation method are stored and executed locally in a computer program with program code of a control unit of the hydrostatic machine.

5. The method according to claim 1, wherein the second calculation method ascertains a ratio, namely a quotient, of the first determined torque at a specified drive vector to the second ascertained torque at the specified drive vector.

6. The method according to claim 1, wherein the second calculation method ascertains a ratio, namely a mean value, from a set of quotients for wear values in a given time window, wherein each of the quotients is the quotient of the first determined torque at a specified drive vector to the second ascertained torque at the specified drive vector.

7. A method according to claim 1, wherein the drive vector comprises:
a rotational speed of the drive;
the hydraulic fluid type;
a first pressure of the fluid, the first pressure being the pressure applied to the hydrostatic pump at the working output;
a second pressure of the fluid, the second pressure being the pressure fed into the hydrostatic pump;
a present delivery volume of the hydrostatic machine;
a viscosity of the fluid; and/or
a temperature of the fluid.

8. A method for determining a present state of wear of a hydrostatic machine during the operation of the hydrostatic machine comprising a drive with variable rotational speed and a hydrostatic pump, wherein the drive is designed to drive the hydrostatic pump in order to generate a volume flow of a fluid, and wherein the hydrostatic machine is connected to a fluid transport channel of a hydraulic drive system in which the fluid is transported from the hydrostatic machine to the hydraulic drive system in a driven manner, comprising the following steps:
determining a first torque of the drive at a specified drive vector;
ascertaining a second torque of the drive at the specified drive vector using a first calculation method;
determining the present state of wear of the hydrostatic machine using a second calculation method, in order to compare the first determined torque and the second ascertained torque to one another; and
wherein the first calculation method comprises (i) the use of at least one lookup table, and a value for the second torque of the drive is calculated from the lookup table, and/or (ii) a multivariate regression for evaluating a D-dimensional grid using drive and torque pairs.

9. The method according to claim 8, wherein the first calculation method comprises the use of at least one lookup table, and a value for the second torque of the drive is calculated from the lookup table, and the first calculation method comprises a physical model of the hydrostatic machine, and a value for the second torque of the drive is derived from the physical model.

10. The method according to claim 9, wherein the first and/or the second calculation method are stored and executed locally in a computer program with program code of a control unit of the hydrostatic machine.

11. A method for determining a present state of wear of a hydrostatic machine during the operation of the hydrostatic machine comprising a drive with variable rotational speed and a hydrostatic pump, wherein the drive is designed to drive the hydrostatic pump in order to generate a volume flow of a fluid, and wherein the hydrostatic machine is connected to a fluid transport channel of a hydraulic drive system in which the fluid is transported from the hydrostatic machine to the hydraulic drive system in a driven manner, comprising the following steps:
  determining a first torque of the drive at a specified drive vector;
  ascertaining a second torque of the drive at the specified drive vector using a first calculation method;
  determining the present state of wear of the hydrostatic machine using a second calculation method, in order to compare the first determined torque and the second ascertained torque to one another; and
  wherein the second calculation method ascertains (i) a ratio, namely a quotient, of the first determined torque at the specified drive vector to the second ascertained torque at the specified drive vector and/or (ii) a ratio, namely a mean value, from a set of quotients for wear values in a given time window, wherein each of the quotients is the quotient of the first determined torque at the specified drive vector to the second ascertained torque at the specified drive vector.

12. A method for determining a present state of wear of a hydrostatic machine during the operation of the hydrostatic machine comprising a drive with variable rotational speed and a hydrostatic pump, wherein the drive is designed to drive the hydrostatic pump in order to generate a volume flow of a fluid, and wherein the hydrostatic machine is connected to a fluid transport channel of a hydraulic drive system in which the fluid is transported from the hydrostatic machine to the hydraulic drive system in a driven manner, comprising the following steps:
  determining a first torque of the drive at a specified drive vector;
  ascertaining a second torque of the drive at the specified drive vector using a first calculation method;
  determining the present state of wear of the hydrostatic machine using a second calculation method, in order to compare the first determined torque and the second ascertained torque to one another; and wherein the drive vector comprises:
  a rotational speed of the drive;
  the hydraulic fluid type;
  a first pressure of the fluid, the first pressure being the pressure applied to the hydrostatic pump at the working output;
  a second pressure of the fluid, the second pressure being the pressure fed into the hydrostatic pump;
  a present delivery volume of the hydrostatic machine;
  a viscosity of the fluid; and/or
  a temperature of the fluid.

13. An electrohydrostatic pump device comprising:
  a drive with variable rotational speed and a hydrostatic pump, wherein the drive is designed to drive the hydrostatic pump in order to generate a volume flow of a fluid, and wherein the hydrostatic machine is connected to a fluid transport channel of a hydraulic drive system in which the fluid is transported from the hydrostatic machine to the hydraulic drive system in a driven manner; and
  an electronic control unit capable of performing the following steps:
    determining a first torque of the drive at a specified drive vector by (i) ascertaining a product of a consumption of current of the drive and a proportional factor and/or (ii) measuring the first torque with a torque sensor;
    ascertaining a second torque of the drive at the specified drive vector using a first calculation method; and
    determining the present state of wear of the hydrostatic machine using a second calculation method, in order to compare the first determined torque and the second ascertained torque to one another.

14. A tangible, non-transitory computer readable medium storing a computer program comprising program code for determining a present state of wear of a hydrostatic machine comprising a drive and a hydrostatic pump, wherein when executed the program code performs the following steps:
  determining a first torque of the drive at a specified drive vector;
  ascertaining a second torque of the drive at the specified drive vector using a first calculation method, wherein the first calculation method comprises (i) the use of at least one lookup table, and a value for the second torque of the drive is calculated from the lookup table, and/or (ii) a multivariate regression for evaluating a D-dimensional grid using drive and torque pairs; and
  determining the present state of wear of the hydrostatic machine using a second calculation method, in order to compare the first determined torque and the second ascertained torque to one another.

* * * * *